United States Patent [19]
Burkett et al.

[11] 3,760,273
[45] Sept. 18, 1973

[54] ELECTRONIC WATT HOUR METER

[75] Inventors: Wilford B. Burkett, Pacific Palisades; George D. Carlsen, II, Playa Del Rey, both of Calif.

[73] Assignee: McCulloch Corporation, Los Angeles, Calif.

[22] Filed: June 24, 1971

[21] Appl. No.: 156,376

[52] U.S. Cl. .............................................. 324/142
[51] Int. Cl. ............................................ G01n 21/00
[58] Field of Search .......................... 324/142, 111; 328/160; 307/265; 235/194; 332/9

[56] References Cited
UNITED STATES PATENTS

| | | | |
|---|---|---|---|
| 3,500,200 | 3/1970 | Woodhead .......................... | 324/142 |
| 2,919,408 | 12/1959 | Brown .............................. | 324/111 X |
| 3,343,084 | 9/1967 | Gambale et al. ................. | 324/142 X |
| 2,637,820 | 5/1953 | McCreary ....................... | 324/111 X |

*Primary Examiner*—Alfred E. Smith
*Attorney*—Christie, Parker & Hale

[57] ABSTRACT

A method of measuring a selected unit of energy such as a watt hour comprising the steps of measuring the current flowing through a load, measuring the voltage across the load, generating a first series of periodic pulses related in width to the rms value of the current measured and related in amplitude to the rms value of the voltage measured, integrating the first series of pulses, and generating a second series of pulses related in number to the integral by generating a pulse each time that a capacitor is charged from the integrated signal to a predetermined voltage. The range of measurement is extended by modifying the method so that the first series of pulses are not directly integrated but rather are first converted to a second series of pulses from a constant current source which second series of pulses are integrated. The invention also relates to the electronic circuitry of a watt hour meter including means for generating a series of pulses having a width directly related to the measured current, means for multiplying the series of pulses representing the measured current and the unknown voltage, means for integrating the multiplied signal, and means for developing a series of pulses related in number to the integral by generating a pulse each time that a capacitor is charged from the integrated signal to a predetermined value.

21 Claims, 3 Drawing Figures

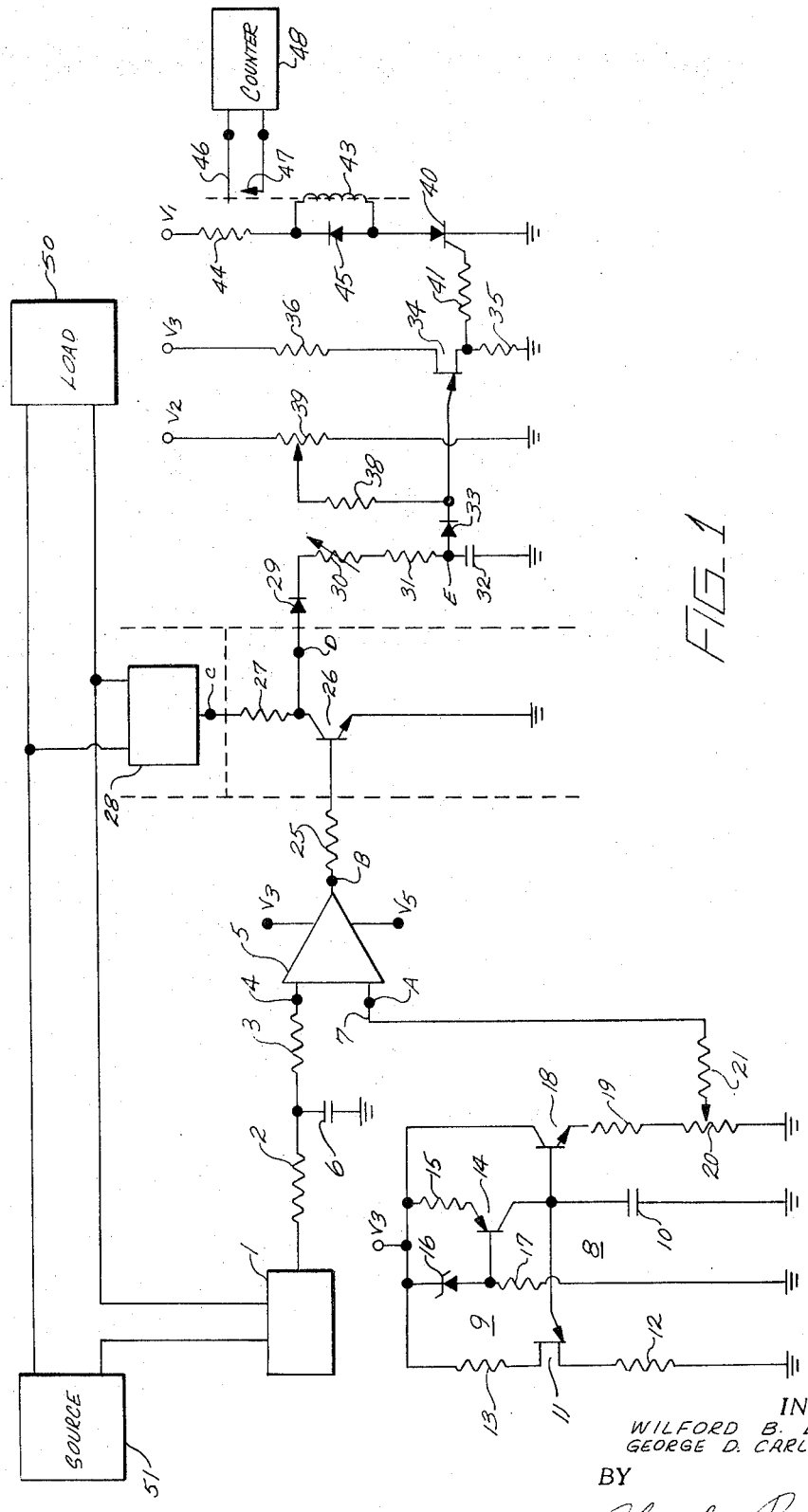

ELECTRONIC WATT HOUR METER

BACKGROUND OF THE INVENTION

1. Field of the Invention

This invention relates to meters for measuring and recording power or energy supplied from a source or used by a load and more particularly to watt meters, amp hour meters, and watt hour meters. Meters for measuring energy, such as the common electrodynamic wattmeter, have been in use for many years. In particular, the dynamotor type or rotating disc type may be found in most homes for recording the watt hours of energy consumed. These types of energy meters have moving parts and permanent magnets which result in a bulky relatively heavy device. Additionally, these meters are only accurate over a narrow range and are generally designed for use with one particular voltage.

2. Summary of the Invention

The energy meters of this invention have no moving parts in the measuring section and are non-mechanical in operation. The resultant energy meters are lightweight and compact and in accordance with one aspect of the invention have an extended range capability to make it universally applicable. The method of the present invention comprises the steps of measuring the current flowing through a load, measuring the voltage across the load, generating a first series of periodic pulses having a width related to the measured current and an amplitude related to the measured voltage, integrating the first series of pulses and generating a second series of pulses related in number to the integral by generating a pulse each time a capacitor is charged from the integrated signal to a predetermined value.

The meter comprises a current section, a voltage section, a multiplier section for combining the current and the voltage, and a measuring section. The current section includes a means for sampling the current a plurality of times in a second, and a means for generating a series of pulses having a pulse width related to the measured current. The multiplier section includes circuit means for combining the series of pulses having a width related to the measured current and the measured voltage for producing a series of pulses having a pulse width related to the measured current and an amplitude related to the measured voltage. The output of the multiplier section may be averaged to determine the power consumed by a load or the power supplied by a source or it may be integrated with respect to time to determine the energy consumed by a load or provided by a source.

For an amp hour meter or a watt hour meter the measuring section includes a means for integrating the output of the multiplier section and for generating a series of pulses related in number to the integral by generating a pulse each time a capacitor in the measuring section is charged to a predetermined voltage. The range of the energy meter of the present invention is extended by the inclusion of an effective constant current source between the measuring section and the multiplier section for producing a current for charging the capacitor in the measuring section with the current having an amplitude related to the voltage measured and a duration related to the current measured.

BRIEF DESCRIPTION OF THE DRAWINGS

These and other features and advantages of the invention may be understood more fully and clearly upon consideration of the following specification and the drawings in which:

FIG. 1 is a schematic diagram of an energy meter in accordance with the present invention;

DESCRIPTION OF THE PREFERRED EMBODIMENT

Figure 3:
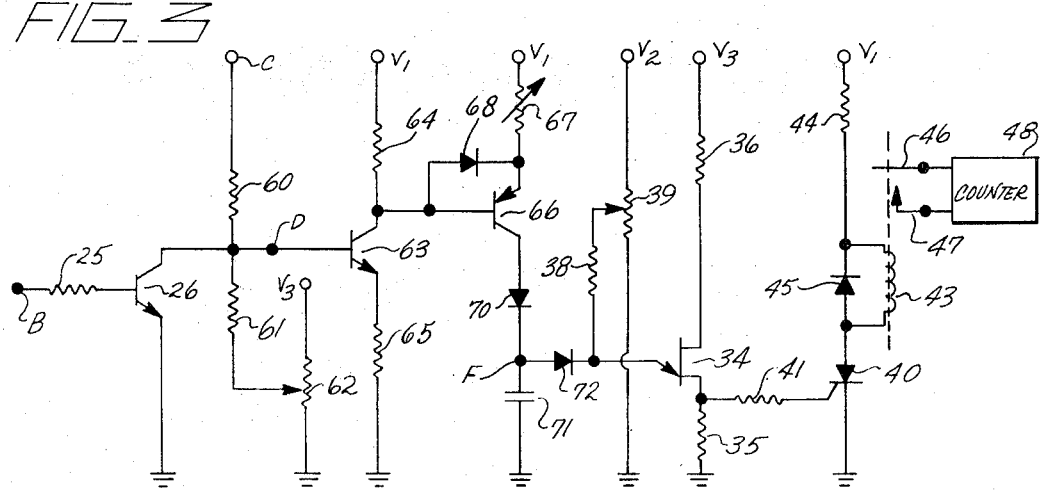
FIG. 3 is an alternative embodiment for a portion of the meter of FIG. 1 in accordance with the present invention.

The energy meter of the present invention is essentially made up of four sections which are separated by dotted lines in FIG. 1. The section to the left of the first dotted line in FIG. 1 is a current section; the section to the right of the dotted lines in FIG. 1 is the measuring section and the section in the upper part of the drawing between the two dotted lines is the voltage section, while the section in the lower part between the two dotted lines is the multiplier section.

The amount of electrical energy supplied to a load is determined by measuring the power-per-unit time during a given interval of time. The power is generally in the unit of watts while the electrical energy may be in any desired unit such as watt seconds or watt hours. The energy meter of FIG. 1 measures the current supplied to a load and the voltage across the load and combines these to give an indication of the power supplied to the load. The meter further provides means for relating this power to time to give an indication of the energy supplied to the load. The energy meter of FIG. 1 comprises a circuit means 1 for measuring the current to the load. The current means 1 may in one non-limiting example be a shunt for converting the current to a voltage with the voltage being directly related to the magnitude of the current. The output of the circuit means 1 is coupled through a pair of resistors 2 and 3 in series to one input terminal 4 of a comparator circuit 5. The comparator circuit 5 may advantageously be an integrated circuit. A filter capacitor 6 is connected between the resistors 2 and 3 and ground reference. The comparator circuit 5 has a second input terminal 7 to which a source 8 of reference voltage is connected. Source 8 provides a reference voltage having a sawtooth waveform as shown in curve A of FIG. 2. The reference voltage of curve A has a preselected peak value and a preselected repetition rate. The sawtooth waveform of the voltage from source 8 effectively samples the measured current a predetermined number of times in a given interval of time. In one example the sawtooth waveform has a repetition rate of one kilohertz so that the measured current is sampled at least once every millisecond.

Source 8 includes a relaxation oscillator 9 having a timing capacitor 10 connected between the emitter of a unijunction transistor 11 and ground reference. The lower base of unijunction transistor 11 is connected through a resistor 12 to ground reference and the upper base thereof is connected through a resistor 13 to a source of voltage $V_3$. The timing circuit of the oscillator 9 further includes a PNP transistor 14 having its collector connected to the emitter of unijunction transistor 11 and its emitter connected through a resistor 15 to the source of voltage $V_3$. The base of the transistor 14 is connected to a voltage divider comprised of a Zener diode 16 in series with a resistor 17 between voltage source $V_3$ and ground reference. The output of the oscillator 9 is coupled through a transistor 18 to the one input terminal 7 of comparator 5. The collector of transistor 18 is connected directly to the source of voltage $V_3$ while the emitter of transistor 18 is connected through a resistor 19 in series with a potentiometer 20 to ground reference. The base of transistor 18 is connected to the emitter of unijunction transistor 11.

The output of the source 8 as developed across the potentiometer 20 is coupled through a resistor 21 to the input terminal 7 of comparator 5. The output of comparator 5 is coupled through a resistor 25 to the base of a transistor 26 in the multiplier section of the meter. The emitter of transistor 26 is connected to ground reference while the collector is connected through resistor 27 to the output of a voltage measuring circuit 28. The output of the voltage measuring circuit 28 is a level as indicated by curve C in FIG. 2. The input to voltage measuring circuit 28 is connected across the load to measure the voltage across the load.

Figure 2:
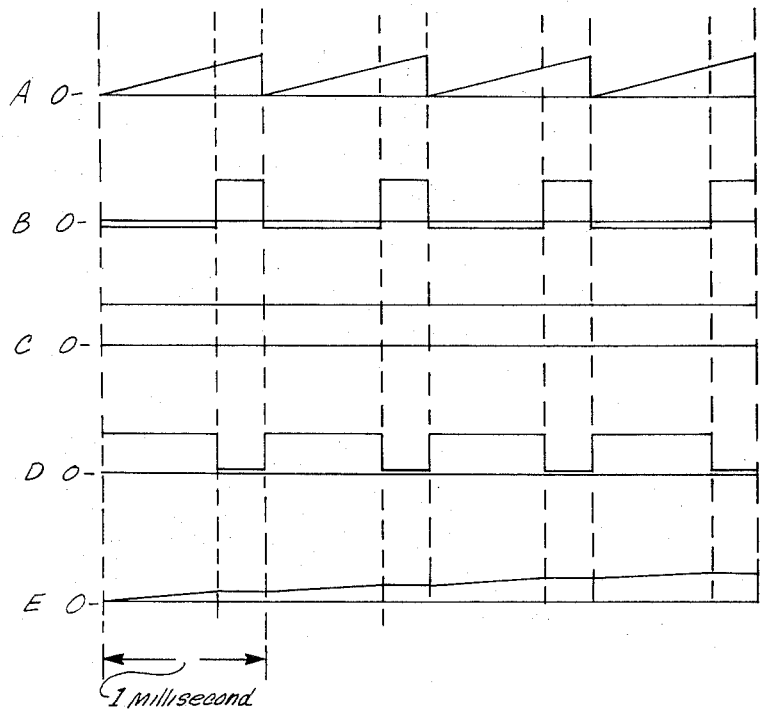
FIG. 2 is a chart showing the wave forms of the signals at various points in the meter of FIG. 1, which chart is useful in understanding the present invention.

The output of the multiplier section 1 which appears at the collector of transistor 26 is representatively shown by curve D of FIG. 2. This signal is applied to the measuring section of the meter through a diode 29. The anode of the diode 29 is connected to the collector of transistor 26 while the cathode of diode 29 is connected through a variable resistor 30 in series with a fixed resistor 31 to an integrating capacitor 32. One side of the capacitor 32 is connected to ground reference. The signal across the capacitor is representatively shown by curve E in FIG. 2. The voltage across the capacitor 32 is coupled through a diode 33 to the emitter of a unijunction transistor 34 in the measuring section of the meter. The lower base of transistor 34 is connected through a resistor 35 to ground reference while the upper base is connected through a resistor 36 to the source of voltage $V_3$. A bias is provided for the unijunction transistor 34 through the combination of a resistor 38 and a potentiometer 39. The potentiometer 39 is connected between a voltage source $V_2$ and ground reference while resistor 38 is connected between the movable arm of the potentiometer 39 and the emitter of the unijunction transistor 34. The output of the unijunction transistor 34 is developed across the resistor 35 in the lower base of the transistor and controls the operation of a silicon controlled rectifier 40. The gate of the silicon controlled rectifier 40 is connected through a resistor 41 to the lower base of transistor 34. The cathode of silicon controlled rectifier 40 is connected to ground reference and the anode is connected through a relay winding 43 and a resistor 44 in series to a voltage source $V_1$. A diode 45 is connected across the relay winding 43 to permit the dissipation of energy in the winding 43 upon cessation of current flow through the winding 43 at the end of conduction through rectifier 40. Relay 43 controls the operation of a movable contact 46 with respect to a fixed contact 47 which contacts are connected to the inputs of a counter 48.

In operation the current measuring circuit 1 develops a voltage having an amplitude related to the magnitude of the current flowing through a load 50 from a source 51. In one non-limiting example the voltage at the output of the current measuring circuit 1 has a value between zero and fifty millivolts. This voltage is compared in the comparator circuit 5 to the output of reference voltage source 8, which has a peak value of 50 millivolts and a sawtooth waveform with a period of one millisecond. For increased accuracy the frequency of the output signal of source 8 may be increased so that the measured current can be sampled more frequently.

The comparator normally has a low level output which is representatively shown in curve B as a slightly negative voltage. As the reference voltage from source 8 increases to the point where it equals the voltage applied to input terminal 4, which voltage is representative of the measured current, the comparator 5 changes states and its output goes to a high level or a positive voltage. The duration of low level output from comparator 5 is directly related to the magnitude of the measured current and is therefore representative of the magnitude of the measured current. The output of comparator 5 will remain at the high level until the end of the sawtooth wave from source 8 when it returns to the low level or slightly negative voltage. The measured voltage across the load 50 appears as an output signal from voltage measuring circuit 48 at point C. This is a positive voltage which is applied to the collector of transistor 26 through resistor 27. The transistor 26 is forward biased during the period of time that the output of comparator 5 is at a high level. The high level voltage at the output of comparator 5 is sufficient to bias the transistor 26 in saturation so that essentially ground reference appears at the collector of transistor 26 and at point D in the circuit of FIG. 1. Thus during the time that the transistor 26 is off, the output voltage from voltage measuring circuit 28 is applied to integrating capacitor 32 through diode 29 and resistors 30 and 31. Thus the capacitor 32 will attempt to charge to the voltage at point C, which voltage is representative of the measured voltage. However, the voltage will be removed for an interval of time which is the interval of time after the sawtooth voltage from source 8 attains the value of the voltage representative of the measured current to the end of the sawtooth. In other words, the voltage representative of the measured voltage is applied to the integrating capacitor circuit for an interval of time directly related to the magnitude of the measured current. Thus transistor 26 and its related circuitry functions as a multiplier circuit and in operation acts like a switch for applying the measured voltage to the integrating circuit for an interval of time determined by the magnitude of the measured current.

The signal at point D, which is a series of periodic pulses related in width to the rms value of the current measured and related in amplitude to the rms value of the voltage measured, may be averaged to give an indication of the power consumed by the load, thereby resulting in a watt meter. Alternatively the signal may be integrated with respect to time to provide a measure of the watt hours or total energy consumed by the load. When the voltage level on the integrating capacitor 32 reaches a set level representing 1 watt hour, the capacitor discharges through unijunction transistor 34 to turn on silicon controlled rectifier 40, which energizes relay 43 to store one count in the counter 48. Thereafter each time the integrating capacitor 32 reaches the set level indicating the consumption of one watt hour, the relay 43 is energized through silicon controlled rectifier 40 and unijunction 34 to count another watt hour. Thus the output of counter 48 indicates the total energy consumed by the load 50.

The energy meter of FIG. 1 may advantageously be modified to produce an amp hour meter which is useful in determining the amount of charge stored in a battery during a charging cycle or the amount of energy removed from a battery during a discharging cycle. In converting the meter of FIG. 1 to an amp hour meter, a reference voltage of constant magnitude is applied to point C in place of the voltage representing the measured voltage.

In the meter of FIG. 1 the integrating capacitor 32 attempts to charge to the voltage applied to point C and this voltage may vary anywhere between zero volts and some upper limit. When the measured voltage is at a relatively low voltage, for example near zero volts, the integrating capacitor 32 will be charging on a non-linear portion of its curve. Similarly for relatively high voltages, the integrating capacitor 32 will charge on a non-linear portion of its charge curve which will result in an error in the energy measured by the meter, consequently the meter of FIG. 1 may be modified by employing the circuit of FIG. 3 which is connected to points B and C of the circuit of FIG. 1 at the points B and C in the alternative embodiment of FIG. 3. The measured voltage is applied to point C and the output signal from comparator 5 appearing at point B is applied to point B in the circuit of FIG. 3. Resistor 25 is again connected to the base of transistor 26 which has its emitter connected to ground reference. However, the collector circuit of transistor 26 is different in the circuit of FIG. 3 from the circuit of FIG. 1.

The measured voltage is applied to a voltage divider network of a resistor 60 in series with a resistor 61. The lower end of resistor 61 is held at a selected voltage level by connecting it to the movable arm of potentiometer 62. The potentiometer 62 is connected between a voltage source $V_3$ and ground reference. The junction of resistors 60 and 61 is connected to the collector of transistor 26 and also to the base of a transistor 63. Transistor 63 is the active element of a unity gain amplifier which has a pair of equal valued resistors 64 and 65 with resistor 64 being connected between the collector of transistor 63 and a source of voltage $V_1$ and the resistor 65 being connected between the emitter of transistor 63 and ground reference. The output of the transistor circuit 63 is taken from the collector and coupled to the base of a PNP transistor 66. The emitter of transistor 66 is connected through a variable reflector 67 to a source of voltage $V_1$. A speed-up diode 68 is connected between the base and emitter of transistor 66 with the anode of the diode being connected to the base. The collector of transistor 66 is connected through a diode 70 to an integrating capacitor 71. The cathode of diode 70 is connected to one side of the capacitor 71 while the other side of the capacitor 71 is connected to ground reference. A diode 72 is connected between the junction of diode 70 and capacitor 71 and the emitter of a unijunction transistor 34. The remainder of the circuit of FIG. 3 is identical to the corresponding portion of the circuit in FIG. 1 and therefore the same reference numerals are employed.

In operation, a series of pulses is applied to point B which have a waveform that is identical to the waveform of curve B in FIG. 2. Again, transistor 26 is saturated during the interval of time from the time of the reference voltage equaling the voltage representative of the measured current to the end of the sawtooth waveform so that a portion of the measured voltage appears at point D for an interval of time related to the magnitude of the measured current. The measured voltage at point C is divided between resistors 60 and 61, which resistors have a predetermined ratio. For example resistors 60 and 61 may have a one to one relationship or for a greatly extended range of operation resistor 60 may have a different relationship with respect to resistor 61. For example if resistor 60 is ten times larger than resistor 61, then the range of measured voltage for which the meter is effective is extended 10 times the range when the resistors have a one to one relationship.

The current range may also be extended by using calibrated shunts having selected related ratios in the current measuring circuit 1. Additionally alternating-current voltages and currents can be converted to direct-currents representative of the rms values in the measuring circuits 1 and 28.

A bias voltage for transistor 63 is developed across potentiometer 62 so that the meter may be sensitive to a measured voltage down to zero volts. The voltage representative of the measured voltage appearing at point D forward biases transistor 63 so that it conducts current through resistors 64 and 65. Transistor 63 and its related resistors form an amplifier having unity gain so that its output is representative of its input. Transistor 63 controls the amount of current that flows through transistor 66 into integrating capacitor 71. The transistor 66 and its related circuitry including resistor 67 essentially presents a constant current source to the integrating capacitor 71 so that the capacitor operates in a linear portion of its charge curve at all times. When the voltage across capacitor 71 reaches a preselected level representative of a selected amount of energy, for example one watt hour, the unijunction transistor 34 is triggered on and the capacitor 71 discharges through the emitter-lower base junction of the unijunction transistor 34 and through the resistor 35. The voltage that is developed across resistor 35 gates silicon controlled rectifier 40 on, which energizes relay 43 to close the contacts 46 and 47 so that the counter 48 advances one count to record the measured energy.

The meter that results from the circuits of FIGS. 1 and 3 is lightweight, compact, and requires very little energy for operation. Additionally parts of the circuitry are readily adaptable to integrated circuit packaging with an even further reduction in size and weight.

Various changes or modifications may be made in the details of construction without departing from the spirit and scope of the invention as defined by the appended claims.

What is claimed is:

1. Method of measuring a selected unit of energy in an electrical circuit comprising the steps of:
   developing a first direct-current voltage related to the rms value of the current flowing in the circuit;
   developing a second direct-current voltage related to the rms value of the voltage across the circuit;
   generating a first series of periodic pulses,
   each pulse having a width related to the level of the first direct-current voltage and an amplitude related to the level of the second direct-current voltage;
   integrating the first series of pulses; and generating a second series of pulses related in number to the integral by generating a pulse each time that a selected voltage level is attained upon integration.

2. Method of claim 1 further comprising the additional step of counting the pulses in the second series of pulses.

3. Method of measuring the total energy supplied by a source or absorbed by a load comprising the steps of generating a first reference voltage having a sawtooth waveform at a preselected frequency, generating a first d.c. voltage proportional to the rms value of the measured current, comparing the reference voltage and the first d.c. voltage, generating a first series of pulses having a width proportional to the rms value of the measured current, generating a second d.c. voltage proportional to the rms value of the measured voltage, generating a second series of pulses having a width proportional to the rms value of the measured current and an amplitude proportional to the rms value of the measured voltage, integrating the second series of pulses, and generating a third series of pulses related in number to the integral by generating a pulse each time that a capacitor is charged from the second series of pulses to a predetermined value.

4. Method of measuring in accordance with claim 3 further comprising the additional step of counting the pulses in the third series of pulses.

5. Energy meter for determining the energy in an electrical circuit comprising means for developing a first direct-current voltage level related to the rms value of the current flowing in the circuit;
   means for developing a second direct-current voltage level related to the rms value of the voltage across the circuit;
   circuit means for generating a first series of pulses, each pulse having a width related to the level of the first direct-current voltage;
   circuit means for multiplying the first series of pulses and the second direct-current voltage to produce a second series of pulses with each pulse therein having a pulse width related to the value of the first direct-current voltage and an amplitude related to the value of the second direct-current voltage,
   an integrating circuit for integrating the second series of pulses to produce a voltage level representative of a preselected unit of energy; and
   circuit means responsive to the voltage level for producing an output pulse each time the voltage level is attained in the integrating circuit.

6. Energy meter in accordance with claim 5 further comprising circuit means for counting the pulses at the output of the producing circuit means.

7. Energy meter for determining the energy from a source or the energy absorbed by a load comprising means for measuring the current to the load, means for measuring the voltage across the load, circuit means for generating a reference voltage having a sawtooth waveform at a preselected frequency, circuit means for generating a first d.c. voltage proportional to the rms value of the measured current, circuit means for comparing the reference voltage and the first d.c. voltage and for generating a first series of periodic pulses having a pulse width proportional to the rms value of the measured current, means for generating a second d.c. voltage proportional to the rms value of the measured voltage, circuit means for multiplying the first series of pulses and the second d.c. voltage to produce a second series of periodic pulses having a pulse width proportional to the rms value of the measured current and a pulse amplitude proportional to the rms value of the measured voltage, circuit means for integrating the second series of pulses to produce a voltage level representative of a preselected unit of energy, and circuit means responsive to the voltage level for producing an output pulse each time the voltage level is attained in the integrating circuit.

8. Energy meter in accordance with claim 7 further comprising circuit means for counting the pulses at the output of the producing circuit means.

9. An energy meter for determining the energy in an electrical circuit comprising:
   a current measuring section including a means for developing a first direct-current voltage level representative of the current flowing in the circuit,
   means for developing a reference voltage having a sawtooth waveform and a preselected period, and
   a digital comparator circuit means for comparing the voltage level representing the measured current and the reference voltage,
   the digital comparator changing states when the reference voltage reaches the voltage level representing the measured current for developing a series of pulses having a width related to the magnitude of the measured current;
   a voltage measuring section for developing a second direct-current voltage level related to the measured voltage;
   a multiplier section for combining the first series of pulses having a pulse width representing the measured current and the voltage level representing the measured voltage; and
   a measuring section including means for referencing the output of the multiplier section to a preselected interval of time.

10. An energy meter for determining the energy in an electrical circuit comprising a current measuring section including a means for developing a first direct-current voltage level representative of the current flowing in the circuit,
    means for developing a reference voltage having a sawtooth waveform at a preselected period, and
    means for comparing the first direct-current voltage level and the reference voltage for developing a first series of pulses with each pulse having a width determined by the first direct-current voltage level;
    a voltage measuring section for developing a second direct-current voltage level representative of the voltage across the circuit;
    a multiplier section responsive to the first series of pulses and the second direct-current voltage level for producing a second series of pulses,
    each pulse in the second series having an amplitude related to the second direct-current voltage level and a width related to the first direct-current voltage level; and
    a measuring and recording section including means for integrating the second series of pulses, and means responsive to a predetermined level of voltage across the integrating means for counting the number of times the voltage across the integrating means attains the predetermined value.

11. Energy meter for determining the energy in an electrical circuit comprising:

a current measuring section including means for developing a first direct-current voltage related to the rms value of the current flowing in the circuit, and for producing a series of voltage pulses,
with each pulse having a width related to the level of the first direct-current voltage;
a voltage measuring section including means for developing a second direct-current voltage related to the rms value of the voltage across the circuit;
a unity gain amplifier responsive to the second direct current voltage during an interval of time related to the level of the first direct-current voltage to produce a series of pulses representative of the power in the circuit;
an integrating capacitor for relating the measured power to time;
a constant current source for charging the integrating capacitor with a current related to the second direct-current voltage level and for discrete intervals of time related to the first direct-current voltage level; and
means responsive to a predetermined voltage across the integrating capacitor for counting selected units of energy represented by the predetermined voltage across the integrating capacitor.

12. An energy meter for determining the energy in an electrical circuit comprising:
a current measuring section including a means for developing a first direct-current voltage level representative of the current flowing in the circuit;
means for developing a reference voltage having a sawtooth waveform and a preselected period, and
means for comparing the first direct-current voltage level and the reference voltage for developing a series of pulses with each pulse having a width related to the first direct-current voltage level;
a voltage measuring section for developing a second direct-current voltage level related to the measured voltage;
a unity gain amplifier responsive to the second direct-current voltage level during an interval of time related to the first direct-current voltage level to produce a series of pulses representative of the power in the circuit;
an integrating capacitor for relating the measured power to time;
a constant current source for charging the integrating capacitor with a current determined by the second direct-current voltage level and for discrete intervals of time determined by the first direct-current voltage level; and
means responsive to a predetermined voltage across the integrating capacitor for counting selected units of energy represented by the predetermined voltage across the integrating capacitor.

13. An energy meter for determining the energy in an electrical circuit comprising:
means for developing a first direct-current voltage level related to the current flowing in the circuit;
means for developing a second direct-current voltage level related to the voltage across the circuit;
an integrating capacitor;
circuit means for charging the integrating capacitor, said circuit means appearing as a constant current source to the integrating capacitor;
circuit means for making the capacitor charging means responsive to the first and second direct-current voltage levels for applying a charging current to the integrating capacitor at a rate determined by the second direct-current voltage level and for a duration determined by the first direct-current voltage level; and
means for generating a series of pulses related in number to the integral by generating a pulse each time the integrating capacitor is charged to a predetermined voltage representative of a predetermined unit of energy.

14. A meter in accordance with claim 13 further including means for counting the number of pulses in said series of pulses.

15. An energy meter for determining the energy in an electrical circuit comprising:
circuit means for developing a first direct-current voltage having a level representative of the current flowing in the circuit;
a reference voltage source having a sawtooth waveform;
a comparator for comparing the first direct-current voltage level and the reference voltage for producing a series of voltage pulses having a pulse width related to the first direct-current voltage level;
circuit means for developing a second direct-current voltage level representative of the voltage applied to the circuit;
a transistor gate circuit for developing a second series of voltage pulses having an amplitude related to the second direct-current voltage level and a pulse width related to the first direct-current voltage level;
an integrating capacitor;
means for applying the second series of pulses to the integrating capacitor;
switch means responsive to a predetermined voltage for discharging the capacitor each time a selected unit of energy is applied to the electrical circuit; and
circuit means responsive to the switching means for counting the units of energy.

16. An energy meter for determining the energy in an electrical circuit comprising:
circuit means for developing a first direct-current voltage having a level representative of the current flowing in the circuit;
a reference voltage source having a sawtooth waveform;
a comparator for comparing the first direct-current voltage level and the reference voltage for producing a series of voltage pulses having a pulse width related to the first direct-current voltage level;
means for developing a second direct-current voltage level representative of the voltage across the circuit;
a unity gain amplifier having an input terminal and an output terminal;
a voltage divider network for splitting the second direct-current voltage into two voltages having a predetermined ratio;
means for applying one of the voltages of the voltage divider network to the input of the unity gain amplifier during an interval of time related to the first direct-current voltage level;
an effective constant current source responsive to the output of the unity gain amplifier;
an integrating capacitor;

means for applying the output of the constant current source to the integrating capacitor;

switch means responsive to a predetermined voltage across the integrating capacitor for discharging the capacitor each time a selected unit of energy is supplied to the circuit as represented by the predetermined voltage across the capacitor; and circuit means responsive to the switching means for counting the units of energy.

17. An amp hour meter comprising:

means for developing a first direct-current voltage level representative of the current flowing in an electrical circuit;

means for generating a first series of periodic pulses having a pulse width related to the first direct-current voltage level and having a constant predetermined amplitude;

an integrating circuit for integrating the first series of pulses to produce a voltage level representative of a preselected unit of energy; and circuit means reponsive to the voltage level for producing an output pulse each time the voltage level is attained in the integrating circuit.

18. A digital wattmeter comprising circuit means for developing a first continuous direct-current voltage level representative of the rms value of the current in an alternating-current circuit or of the magnitude of the current in a direct-current circuit;

a ramp generator;

circuit means for comparing the output of the ramp generator to the first voltage level, the comparing means having a digital output of a first series of pulses with the duration between pulses being directly proportional to the rms value or direct-current level of current;

circuit means for developing a second continuous direct-current voltage level representative of the rms value of the voltage in an alternating-current circuit or of the voltage in a direct-current circuit, circuit means for multiplying the first series of pulses and the second direct-current voltage level to produce a second series of pulses having a pulse width proportional to the first voltage level and a pulse amplitude proportional to the second voltage level;

an integrating circuit for integrating the second series of pulses to produce a third voltage level representative of a preselected unit of energy; and circuit means responsive to the third voltage level for producing an output pulse each time the third voltage level is attained in the integrating circuit.

19. Method of measuring a selected unit of electrical energy in an electrical circuit comprising the steps of developing a first direct-current voltage level representative of the current flowing in the circuit;

generating a first series of periodic pulses, each pulse having a width related to the level of the first direct-current voltage and having a constant predetermined amplitude;

integrating the first series of pulses; and generating a second series of pulses related in number to the integral by generating a pulse each time that a predetermined voltage level is attained.

20. Method of measuring a selected unit of energy in an electrical circuit comprising the steps of developing a first direct-current voltage level representative of the current flowing in the circuit;

developing a second direct-current voltage level representative of the voltage across the circuit;

generating a first series of periodic pulses, each pulse having a width related to the first direct-current voltage level and an amplitude related to the second direct-current voltage level;

integrating the first series of pulses; and generating a second series of pulses related in number to the integral by generating a pulse each time that a predetermined voltage level is attained.

21. An energy meter comprising means for developing a first direct-current voltage level representative of the current flowing in an electrical circuit;

means for developing a second direct-current voltage level representative of the voltage across the electrical circuit, circuit means for generating a first series of periodic pulses, each pulse having a width related to the first direct-current voltage level, circuit means for multiplying the first series of pulses and the second direct-current voltage level to produce a second series of pulses with each pulse therein having a width related to the first direct-current voltage level and an amplitude related to the second direct-current voltage level;

an integrating circuit for integrating the second series of pulses to repeatedly produce a voltage level representative of a preselected unit of energy; and circuit means responsive to the voltage level for producing an output pulse each time that the voltage level is attained in the integrating circuit.

* * * * *

UNITED STATES PATENT OFFICE
CERTIFICATE OF CORRECTION

Patent No. 3,760,273      Dated September 18, 1973

Inventor(s) Wilford B. Burkett and George D. Carlsen, II

It is certified that error appears in the above-identified patent and that said Letters Patent are hereby corrected as shown below:

Column 5, lines 49 and 50, "reflector" should read --resistor. Column 9, lines 9 and 10, "direct current" should read --direct-current--. Column 12, line 34, change the comma to a semicolon; line 37, change the comma to a semicolon.

Signed and sealed this 1st day of January 1974.

(SEAL)
Attest:

EDWARD M. FLETCHER, JR.
Attesting Officer

RENE D. TEGTMEYER
Acting Commissioner of Patents